United States Patent [19]

Schäfer

[11] Patent Number: 4,670,023
[45] Date of Patent: Jun. 2, 1987

[54] GAS GENERATOR INSTALLATION

[75] Inventor: Wolfgang Schäfer, Bottrop, Fed. Rep. of Germany

[73] Assignee: Ruhrkohle Aktiengesellschaft, Essen, Fed. Rep. of Germany

[21] Appl. No.: 706,545

[22] Filed: Feb. 28, 1985

[30] Foreign Application Priority Data

Feb. 28, 1984 [DE] Fed. Rep. of Germany ....... 3407157
Aug. 18, 1984 [DE] Fed. Rep. of Germany ....... 3430533

[51] Int. Cl.$^4$ .............................................. C10J 3/68
[52] U.S. Cl. .......................................... 48/77; 48/210;
  60/39.12; 60/39.182; 110/216; 422/147; 55/344
[58] Field of Search ................... 48/77, 210; 60/39.12,
  60/39.182; 55/344–346, 348, 349, 212, 213, 459
  C; 422/147; 210/512.3; 137/625.12, 625.37,
  625.39; 110/216

[56] References Cited

U.S. PATENT DOCUMENTS

| | | | |
|---|---|---|---|
| 853,803 | 5/1907 | Kinander | 137/625.12 |
| 1,223,335 | 4/1917 | Woodward | |
| 1,890,070 | 12/1932 | Whiton, Jr. | 55/213 |
| 2,707,148 | 4/1955 | Kollgaard | 48/201 |
| 3,163,175 | 12/1964 | Pearson | 137/625.37 |
| 3,263,748 | 8/1966 | Jemal et al. | 165/87 |
| 3,310,836 | 3/1967 | Nichols | 18/12 |
| 3,358,624 | 12/1967 | Way | 110/22 |
| 3,727,562 | 4/1973 | Bauer | 110/1 P |
| 3,893,504 | 7/1975 | Gaines, Jr. | 165/1 |
| 3,963,598 | 6/1976 | Manowitz et al. | 208/8 |
| 4,027,699 | 6/1977 | Andersson et al. | 137/625.37 |
| 4,033,730 | 3/1977 | Baron et al. | 48/86 |
| 4,051,791 | 10/1977 | Wormser | 110/28 |
| 4,057,400 | 11/1977 | Kaimann et al. | 48/77 |
| 4,111,158 | 9/1978 | Reh et al. | 122/4 |
| 4,123,502 | 10/1978 | Hölter et al. | 423/230 |
| 4,238,200 | 12/1980 | Richter | 44/16 |
| 4,253,409 | 3/1981 | Wormser | 110/347 |
| 4,343,246 | 8/1982 | Jukkola et al. | 110/222 |
| 4,356,004 | 10/1982 | Richter | 48/210 |
| 4,359,326 | 11/1982 | Hoffert et al. | 48/62 |
| 4,475,467 | 10/1984 | Korenberg | 110/245 |
| 4,476,790 | 10/1984 | Borio et al. | 110/245 |

FOREIGN PATENT DOCUMENTS 3205720 8/1983 Fed. Rep. of Germany .
1289143 9/1972 United Kingdom .
1534214 11/1978 United Kingdom .

OTHER PUBLICATIONS

"Entstaubung Heisser Gase", Rolf Rennhack, Chem.-Ing.-Tech., 51 (1979), Nr. 10, p. 921.

Primary Examiner—David L. Lacey
Attorney, Agent, or Firm—Nils H. Ljungman

[57] ABSTRACT

A coal gasifier has a fluidized bed reactor. The gasifier has a series of cyclones connected to an outlet of the gasifier to clean the gas generated by the fluidized bed reactor to isolate particulate matter. The cyclones are turned on and off individually to compensate for the variations in the gas output of the fluidized bed reactor.

20 Claims, 2 Drawing Figures

GAS GENERATOR INSTALLATION

CROSS REFERENCE TO CO-PENDING APPLICATIONS

Co-pending application Ser. No. 706,546, filed on Feb. 28, 1985, entitled "Cyclone Cleaner For A Fixed Bed Reactor"; co-pending application Ser. No. 706,542, filed on Feb. 28, 1985, entitled "A Combined Steam Turbine And Gas Turbine Electric Power Plant"; and co-pending application Ser. No. 706,543, filed on Feb. 28, 1985, entitled "A Fluidized Bed Coal Gasification Installation In An Electric Power Plant", are all assigned to the same assignee as the instant application and are incorporated herein by reference.

BACKGROUND OF THE INVENTION

1. Field of the Invention

The invention relates generally to gas generator installation, and more particularly, to a gas generator installation with a pressurized fluidized bed or fluidized reactor, in which coal is gasified, and with an apparatus to clean the crude gas which is under high pressure.

For reasons of simplification, the two above-mentioned types of gas generators are lumped together and called pressurized reactors below.

2. Description of the Prior Art

Inside the pressurized reactor, coal fines are gasified under high pressure. The gas produced in this manner can be used, for example, for the production of energy.

It is generally necessary to clean the gas coming out of the pressurized reactor, that is, specifically to free it from dust and tar. In addition, it is generally also necessary to adjust the output of the gas generator in question to the current gas requirement. The latter can change relatively more frequently and in a brief period of time so that it is appropriate if the gas generator is correspondingly adjustable.

If it is desirable to eliminate the inclusion of sufficiently large buffer capacities, as known in the prior art, between the gas generator and a downstream portion of the power plant, then the capacity of the gas generator and the corresponding capacity of the apparatus for the cleaning of the crude gas must be adjusted thereto.

To clean a crude gas, a so-called wet washing is generally used. A wet washing process is disclosed in U.S. Pat. No. 4,123,502. However, this wet washing has the disadvantage that the crude gas, when discharged from the gas generator installation, has been, relatively speaking, cooled off a great deal by the washing. This cooling represents an energy loss which has a deleterious influence on the overall efficiency of a plant containing the gas generator installation.

The following patents describe and show some examples of fluidized bed reactors for gasification of coal, which documents are incorporated herein by reference: U.S. Pat. Nos. 3,963,598; 4,111,158; 4,343,246; 4,359,326; 4,475,467; and 4,476,790.

The following patents describe and show some examples of fixed bed reactors for gasification of coal, which documents are incorporated herein by reference: U.S. Pat. No. 4,238,200 entitled "Process For The Production Of Fuel From Fine Coal For Coal Pressure Gasification In A Fixed Bed Reactor," and U.S. Pat. No. 4,356,004, entitled "Process For Forming Charging Fuel Into Agglomerates For The Pressure Gasification of Coal", and further U.S. Pat. Nos. 1,223,335; 2,707,148; 3,263,748; 3,310,836; 3,893,504; 4,033,730; 4,057,400 and Federal Republic of Germany Pat. No. 2629182.

The gas discharged from the pressurized reactor must be cleaned, for example, specifically freed of dust and tar. The apparatus used for this purpose is generally a wet washer. The use of wet washing causes a reduction in the temperature of the gas and, therefore, a disadvanageous energy loss. As a result, the overall efficiency of the energy generation installation is reduced.

The following are examples of patents having cyclones, which documents are incorporated herein by reference: U.S. Pat. Nos. 3,358,624; 3,727,562; 4,051,791; 4,253,409 and U.K. Pat. No. 1289143.

OBJECT OF THE INVENTION

The object according to the invention is the creation of a gas generator instalation of the type described above so that, on one hand, it meets the requirements for the adjustability of output and, on the other hand, it largely eliminates the current undesirable energy loss.

SUMMARY OF THE INVENTION

This object is achieved by the invention in that the apparatus used to clean the crude gas has at least two cyclones connected in parallel on the input side, and that the cyclones can be turned on or off individually.

A cyclone, of course, is known in another context as an apparatus used to clean a gas. In the framework of a gas generation installation, however, the use of an individual cyclone would be out of the question on account of the absence of the necessary capability of adjustment of capacity. However, if several cyclones are connected in parallel, and if the cyclones can be turned on and off by means of an appropriate control control as a function of the current output requirements, the desired adjustment capability is achieved, while at the same time the use of a wet washing which leads to an energy loss can be avoided.

According to the invention, it is also proposed that the feed of the crude gas to the cyclones be achieved by means of a pipeline. This pipeline has gas discharge tubes which are disposed one behind the other along the longitudinal axis of the pipeline.

The discharge tubes leading to each cyclone extent laterally from the pipeline with each emptying into an associated cyclone pipeline having a closing piston disposed therein which can be moved in the direction of the longitudinal axis and which substantially shuts off the entire cross section of the pipeline.

Depending on the number of cyclones used, a corresponding number of gas discharge tubes are connected to the pipieline. Depending on the position of the closing piston, the desired number of gas discharge tubes can be opened by a corresponding activation and positioning of the closing piston. It is especially advantageous that this control capability can be achieved without the use of valves which would be very difficult and expensive on account of the pressure and temperature conditions. On the other hand, the added technical complexity and investment required for this line system and the closing piston is very low.

To be able to guide the gas current in the region of the end surface of the closing piston, for example at the bend in the individual gas discharge tube, in a manner which is as free of turbulence as possible, the invention also proposes that the end surface of the closing piston facing the gas current be curved toward the cross section of a gas discharge tube. This means that an almost continuous deflection of the gas current between the longitudinal axis of the pipeline and the axis of the gas discharge tube is possible.

BRIEF DESCRIPTION OF THE DRAWINGS

One embodiment of the invention is described in greater detail blow with reference to the drawings.

DESCRIPTION OF THE PREFERRED EMBODIMENTS

Figure 1:
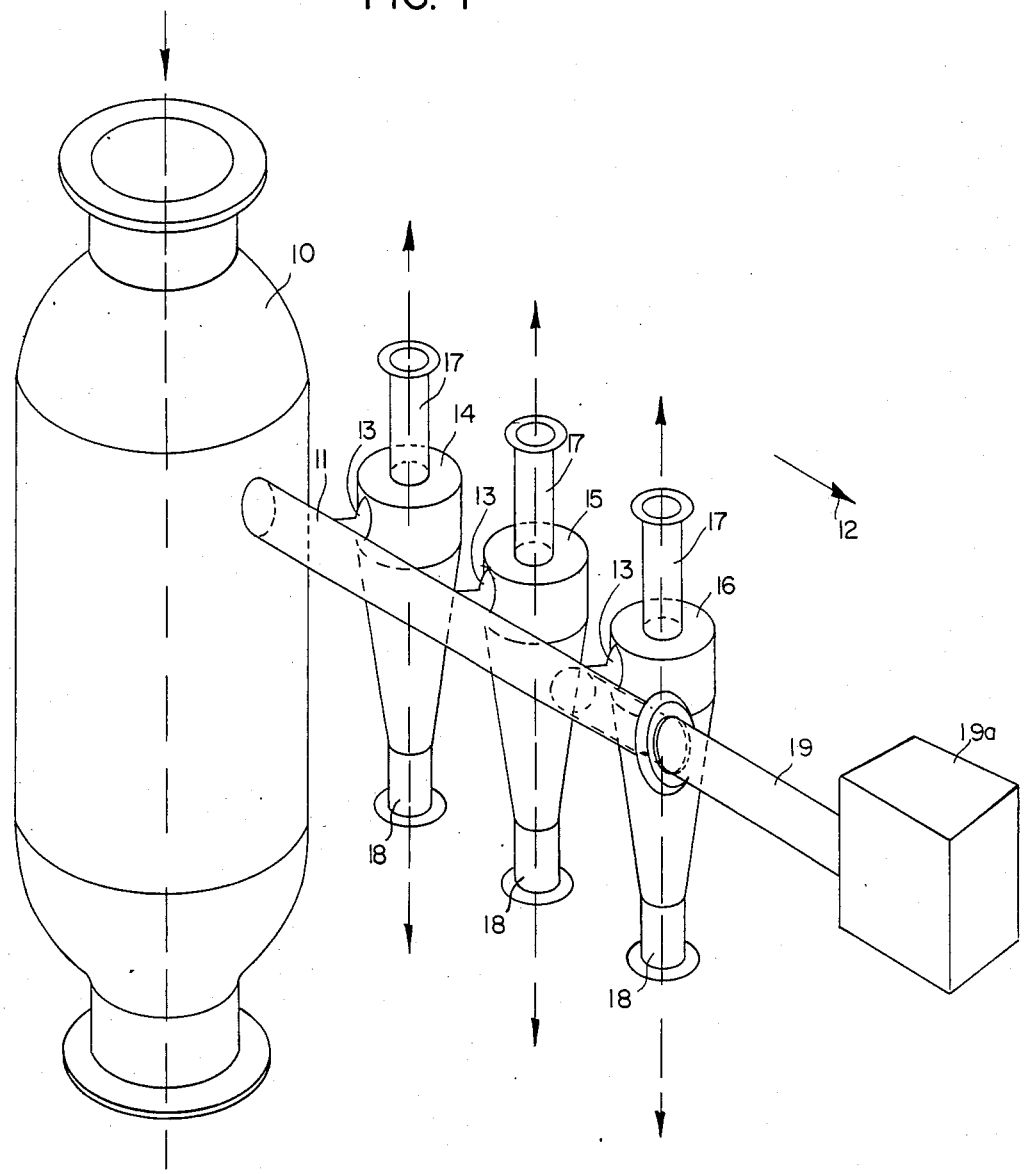
FIG. 1 shows schematically in perspective a compressed gas generation installation with cyclones connected downstream.

In FIG. 1, the pressurized gas generator 10 is fed into a pipeline 11. The direction of flow is indicated by an arrow 12. Gas discharge tubes 13, which run approximately radial to the pipeline, connect into the pipeline 11 like a manifold. Each of the tubes 13 leads to the input of a cyclone 14, 15 or 16. Each of the three cyclones 14, 15 and 16 has, in its upper region, a discharge 17 for cleaned gas, while there is a dust discharge 18 on the bottom of each of the cyclones 14, 15 and 16.

Figure 2:
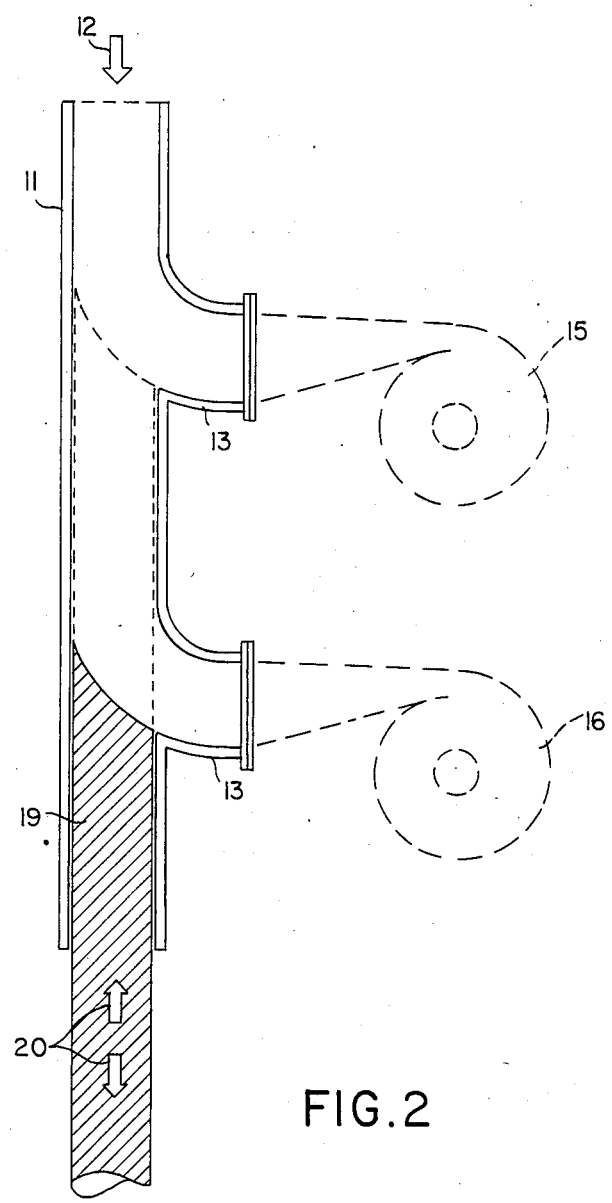
FIG. 2 shows an overhead view of a portion of the installation shown in FIG. 1, with a section of the pipeline with the closing piston therein.

In FIG. 2, in the pipeline 11, there is a closing piston 19 which moves in the longitudinal direction of the line, and which has the form of a rod extending through the pipeline 11. The flow side of the closing piston 19 is curved in such a way that the radius of the curved inflow surface makes the transition as continuous as possible to the corresponding course of the gas discharge tube 13 is question. This guarantees an essentially unform diversion of the gas current into the gas discharge tubes 13 in question.

Referring again to FIG. 1, the closing piston 19 is connected to a drive 19a, by means of which it is possible to move the closing piston 19 in the directions indicated by the two arrows 20. The drive can be designed as a piston-cylinder arrangement or as a motor with an associated rack and pinion gear or similar set-up.

The cyclones 14, 15 and 16 are connected in parallel to one another. By moving the closing piston 19 into the appropriate position, it is possible to pressurize either only the cyclone identified with reference number 14 with gas. In the case where the closing piston 19 is in the appropriate position with respect to the gas discharge tubes 13 corresponding to the cyclone 14, cyclones 15 and 16 are closed off. The closing piston 19, to make the adjustment for an increased amount of gas to be cleaned at the moment, is placed in the corresponding position at the gas discharge tubes 13 of the cylone 15 or of the cyclone 16, so that two or three cyclones are then in operation. This makes possible a proper adjustment of the amount of gas coming from the pressurized gas generator 10 to the amount of gas at which a cyclone of the type used has its optimum cleaning efficiency. The individual cyclones can be turned on and off by means of the proposed apparatus with only a small expense involved for equipment and energy, and also has a very fast response time.

Referring now to FIG. 2, a detailed view of the closing piston 19, and the gas discharge tubes 13 connected to each of its cyclones 15 and 16, is shown. The curve at an inward end of the closing piston 19 is adapted to change the direction of flow, indicated by the arrow 12, in the gradual manner thereby minimizing disturbances in and by the flow.

The closing piston 19 is made from heat resistant material and/or has been surface treated to minimize erosion by the dust in the gases.

The cyclone arrangement as described above may have other applications as an independent unit.

The cyclone arrangement as described above may have other applications such as in a fixed bed reactors.

The invention is not to be taken as limited to all the details that are described hereinabove, since modifications and variations thereof may be made without departing from the spirit or scope of the invention.

What is claimed is:

1. A coal gasifier having fluidized bed means for gasifying coal, said fluidized bed means comprising:
   gas output means;
   said gas output means comprising a conduit;
   a plurality of cyclones connected to said gas output means of said fluidized bed means for cleaning gas generated thereby;
   each of sid plurality of cyclones having a gas inlet means connected to said conduit;
   said conduit having a longitudinal dimension along said conduit;
   sliding rod means for slidingly connecting amnd disconnecting fluid communication of said inlet means of said cyclones individually to and from said gas output means of said fluidized bed means;
   said sliding rod means being disposed in said conduit to move between a first extreme position, wherein all of said fluid communications to said cyclones are closed, and a second extreme position where said fluidized communications to said cyclones are open; and
   said sliding rod means being disposed so as to slidingly turn on and off said cyclones individually in a sequence as said rod means moves between said first extreme position and said second extreme position.

2. The coal gasifier having fluidized bed means for gasifying coal according to claim 1 wherein said fluidized bed means comprises a pressurized fluidized bed reactor.

3. The coal gasifier having fluidized bed means for gasifying coal according to claim 2 wherein each of said cyclones comprises a high pressure cyclone.

4. The coal gasifier having fluidized bed means for gasifying coal according to claim 3 wherein
   said sliding rod means for selectively connecting said disconnecting comprises a piston disposed in said conduit to move therealong adjacent said inlet means of said cyclones to cover and uncover said inlet means of said cyclones; and including
   means for moving said piston in said conduit to cover and uncover said inlet means of said cyclones.

5. The coal gasifier having fluidized bed means for gasifying coal according to claim 4 wherein said inlet means of said cyclones comprise tubes which connect into said conduit at a side of said conduit and are disposed one behind the other.

6. The coal gasifier having fluidized bed means for gasifying coal according to claim 5 wherein said piston has a curved surface at one end thereof to change the direction of gas flowing in said conduit to admit said flowing gas into said inlet means, of said cyclones, said one end of said piston having said curved surface being disposed within said conduit.

7. The coal gasifier having fluidized bed means for gasifying coal according to claim 4 wherein said piston has a curved surface at one end thereof to change the direction of gas flowing in said conduit to admit said flowing gas into said inlet means of said cyclones, said one end of said piston having said curved surface being disposed within said conduit.

8. The coal gasifier having fluidized bed means for gasifying coal according to claim 2 wherein
said sliding rod means for selectively connecting and disconnecting comprises a piston disposed in said conduit to move therealong adjacent said inlet means of said cyclones to cover and uncover said inlet means of said cyclones; and including
means for moving said piston in said conduit to cover and uncover said inlet means of said cyclones.

9. The coal gasifier having fluidized bed means for gasifying coal according to claim 8 wherein said inlet means of said cyclones comprise tubes which connect into said conduit at a side of said conduit and are disposed one behind the other.

10. The coal gasifier having fluidized bed means for gasifying coal according to claim 9 wherein said piston has a curved surface at one end thereof to change the direction of gas flowing in said conduit to admit said flowing gas into said inlet means of said cyclones, said one end of said piston having said curved surface being disposed within said conduit.

11. The coal gasifier having fluidized bed means for gasifying coal according to claim 4 wherein said piston has a curved surface at one end thereof to change the direction of gas flowing in said conduit to admit said flowing gas into said inlet means of said cyclones, said one end of said piston having said curved surface being disposed within said conduit.

12. The coal gasifier having fluidized bed means for gasifying coal according to claim 1 wherein each of said cyclones comprises a high pressure cyclone.

13. The coal gasifier having fluidized bed means for gasifying coal according to claim 12 wherein
said sliding rod means for selectively connecting and disconnecting comprises a piston disposed in said conduit to move therealong adjacent said inlet means of said cyclones to cover and uncover said inlet means of said cyclones; and including
means for moving said piston in said conduit to cover and uncover said inlet means of said cyclones.

14. The coal gasifier having fluidized bed means for gasifying coal according to claim 13 wherein said inlet means of said cyclones comprise tubes which connect into said conduit at a side of said conduit and are disposed one behind the other.

15. The coal gasifier having fluidized bed means for gasifying coal according to claim 14 wherein said piston has a curved surface at one end thereof to change the direction of gas flowing in said conduit to admit said flowing gas into said inlet means of said cyclones, said one end of said piston having said curved surface being disposed within said conduit.

16. The coal gasifier having fluidized bed means for gasifying coal according to claim 13 wherein said piston has a curved surface at one end thereof to change the direction of gas flowing in said conduit to admit said flowing gas into said inlet means of said cyclones, said one end of said piston having said curved surface being disposed within said conduit.

17. The coal gasifier having fluidized bed means for gasifying coal according to claim 1 wherein
said sliding rod means for selectively connecting and disconnecting comprises a piston disposed in said conduit to move therealong adjacent said inlet means of said cyclones to cover and uncover said inlet means of said cyclones; and including
means for moving said piston in said conduit to cover and uncover said inlet means of said cyclones.

18. The coal gasifier having fluidized bed means for gasifying coal according to claim 17 wherein said piston has a curved surface at one end thereof to change the direction of gas flowing in said conduit to admit said flowing gas into said inlet means of said cyclones, said one end of said piston having said curved surface being disposed within said conduit.

19. The coal gasifier having fluidized bed means for gasifying coal according to claim 17 wherein said piston comprises a piston with a closed end surface, said closed end surface being disposed in said conduit.

20. The coal gasifier having fluidized bed means for gasifying coal according to claim 1 wherein said piston has a curved surface at one end thereof to change the direction of gas flowing in said conduit to admit said flowing gas into said inlet means of said cyclones, said one end of said piston having said curved surface being disposed within said conduit.

* * * * *